United States Patent [19]
Aplin

[11] 3,722,370
[45] Mar. 27, 1973

[54] HYDRAULIC WHEEL MOTOR UNIT

[76] Inventor: Neville Frederick Aplin, 3 Gleneagles Drive, Southport, England

[22] Filed: Mar. 23, 1971

[21] Appl. No.: 127,121

[30] Foreign Application Priority Data

Mar. 31, 1970 Great Britain..................15,156/70

[52] U.S. Cl..............................................91/506
[51] Int. Cl..........................................F01b 13/06
[58] Field of Search................91/504–506, 499; 74/687

[56] References Cited

UNITED STATES PATENTS

| | | | |
|---|---|---|---|
| 2,722,889 | 11/1955 | Wahlmark | 91/499 |
| 2,815,718 | 12/1957 | Avery | 91/498 |
| 3,075,472 | 1/1963 | Garnier | 91/506 |
| 3,283,612 | 11/1966 | Deasham | 74/687 |
| 3,535,984 | 10/1970 | Anderson | 91/506 |

FOREIGN PATENTS OR APPLICATIONS

| | | | |
|---|---|---|---|
| 675,754 | 7/1952 | Great Britain | 91/499 |

*Primary Examiner*—William L. Freeh
*Attorney*—Holman & Stern

[57] ABSTRACT

A wheel drive unit includes a housing including an end plate on which there is a spigot. The spigot carries a cam plate for an axial piston type rotor journalled on the spigot. The unit has an output shaft coaxial with the spigot and this shaft is driven by the rotor through an epicyclic reduction gear of which external teeth on the rotor form the sun pinion.

5 Claims, 1 Drawing Figure

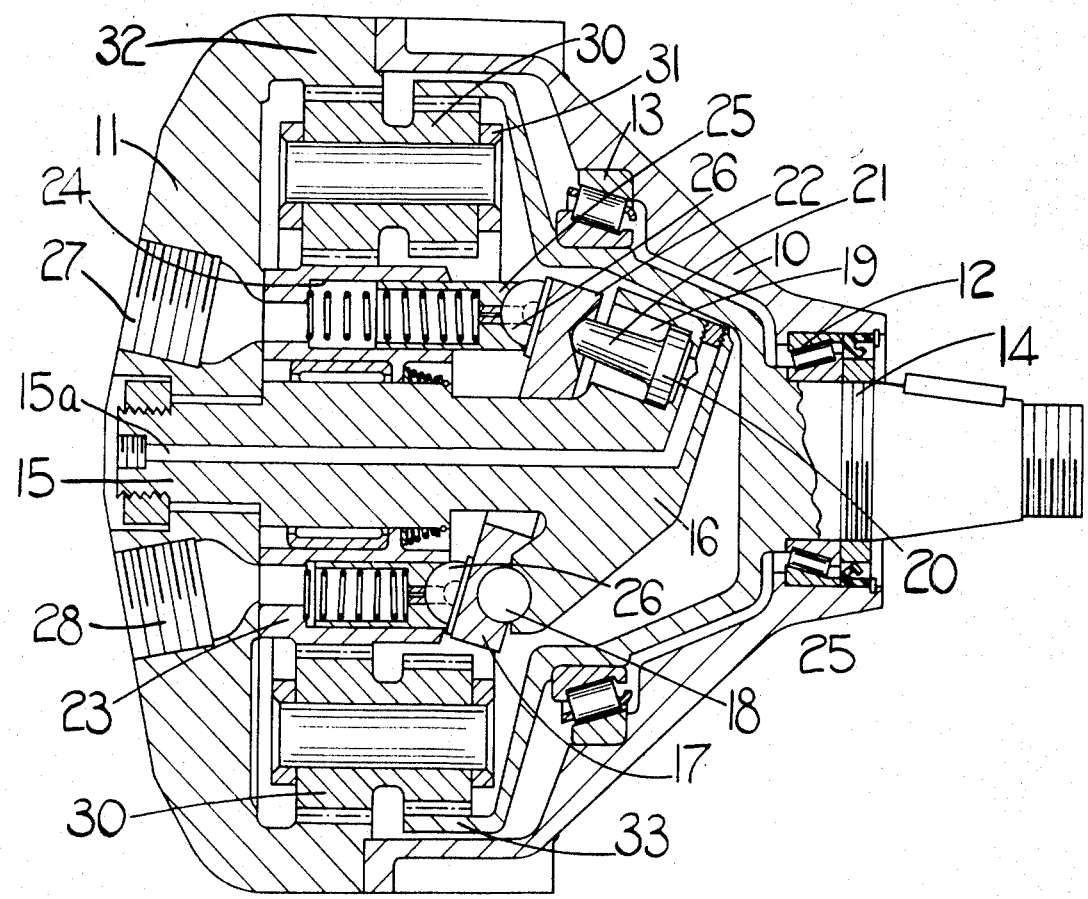

HYDRAULIC WHEEL MOTOR UNIT

BACKGROUND OF THE INVENTION

This invention relates to an hydraulic wheel motor unit and has as an object to provide such a unit in a convenient form.

SUMMARY OF THE INVENTION

A unit in accordance with the invention comprises a housing including an end plate, a spigot projecting from said end plate, a cross member on a free end of the spigot, a cam plate pivotally mounted on said cross member on one side of the spigot, a piston slidable in a bore in the cross member on the other side of the spigot, a stem on said piston engaging the cam plate so that movement of the piston causes variation of the inclination of the cam plate, a passage extending along the spigot and being connected to said bore, a rotor in the housing and surrounding the spigot, said rotor being formed with a plurality of axially extending bores, a plurality of pistons slidable in said bores respectively, a plurality of slippers on said pistons respectively engaging said cam plate, the end plate being formed with ports into communication with which the bores in the rotor are successively brought on the rotation of the rotor, and said rotor having external gear teeth, an output shaft co-axial with the spigot and carried in bearings in the housing, and an epicyclic gear train, of which said teeth on the rotor form the sun wheel, driving the output shaft.

BRIEF DESCRIPTION OF THE DRAWING

In the accompanying drawing there is illustrated, in section, an example of an hydraulic wheel motor unit in accordance with the invention.

DETAILED DESCRIPTION OF THE DRAWING

The unit includes a housing formed in two parts namely a cup-shaped part 10 and an end plate 11. The cup-shaped part has bearings 12, 13 for an output shaft 14.

A spigot member 15 is secured to the end plate 11 and projects into the interior of the housing. At its free end the spigot 15 has a cross-piece 16 which carries a cam plate 17. In fact this cam plate is of generally annular form and is pivoted by means of a pivot joint 18 to the cross member 16 at one side of the spigot. At the other side of the spigot the cross piece 16 is formed with a bore 19 in which there is slidable a piston 20 having a stem 21 engaging the cam plate 17 in a notch 22 therein.

Surrounding the spigot inside the housing is a rotor 23 which is formed with a plurality of axially extending bores 24 in which pistons 25 are slidable. Each piston 25 carries a slipper 26 on its end which engages the cam plate 17.

The end plate 11 is formed with ports 27, 28 into communication with which the bores 24 in the rotor 23 are successively brought as the rotor is rotated in use. In fact, the ports 27, 28 are shown in the wrong position in the end plate, as is conventional in drawings of pumps and motors of this kind, and the end plate 11, should, in fact, be turned through 90° about the axis of the spigot 15.

The rotor 24 is formed with external gear teeth which mesh with the larger parts of a plurality of compound pinions 30 carried by a planet pinion carrier 31. These larger parts of the pinions 30 also mesh with internal teeth on a flange 32 on the end plate. The smaller parts of the pinions 30 mesh with internal teeth on a bell 33 on the output shaft 14.

There is thereby provided an epicyclic reduction gear train connecting the rotor 23 with the output shaft 14. The arrangement shown provides a very convenient form of hydraulic wheel motor unit in which variation of the displacement of the motor is readily adjusted by variation of the pressure applied to the piston 20 through a passage 15a in the spigot.

Having thus described my invention what I claim as new and desire to secure by Letters Patent is:

1. An hydraulic wheel motor unit comprising a housing including an end plate, a spigot projecting from said end plate, a cross member on a free end of the spigot, a cam plate pivotally mounted on said cross member on one side of the spigot, a piston slidable in a bore in the cross member on the other side of the spigot, a stem on said piston engaging the cam plate so that movement of the piston causes variation of the inclination of the cam plate, a passage extending along the spigot and being connected to said bore, a rotor in the housing and surrounding the spigot, said rotor being formed with a plurality of axially extending bores, a plurality of pistons slidable in said bores respectively, a plurality of slippers on said pistons respectively engaging said cam plate, the end plate being formed with ports into communication with which the bores in the rotor are successively brought on the rotation of the rotor, and said rotor having external gear teeth, an output shaft co-axial with the spigot and carried in bearings in the housing and an epicyclic gear train, of which said teeth on the rotor form the sun wheel, driving the output shaft.

2. A unit as claimed in Claim 1 in which said epicyclic gear train comprises a plurality of planet pinions meshed with the teeth on the rotor, a planet pinion carrier on which said planet pinions are journalled, a fixed internally toothed member in the housing meshed with said planet pinions and a further internally toothed member rotatable with the output shaft and meshed with the planet pinions.

3. A unit claimed in claim 2 in which the planet pinions are of compound form having larger parts meshed with the teeth on the rotor and with the fixed internally toothed member and smaller parts meshed with said further internally toothed member.

4. A unit as claimed in claim 2 in which said fixed internally toothed member comprises a flange integral with the end plate.

5. A unit as claimed in claim 2 in which the further internally toothed member comprises a bell integral with the output shaft.

* * * * *